US012748604B2

(12) United States Patent
Zhang

(10) Patent No.: US 12,748,604 B2
(45) Date of Patent: Sep. 29, 2026

(54) MANAGEMENT METHOD AND APPARATUS FOR SCENARIO DATA, ELECTRONIC DEVICE, AND READABLE MEDIUM

(71) Applicant: BOE Technology Group Co., Ltd., Beijing (CN)

(72) Inventor: Kefei Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 369 days.

(21) Appl. No.: 18/284,075

(22) PCT Filed: Feb. 20, 2023

(86) PCT No.: PCT/CN2023/077101
§ 371 (c)(1),
(2) Date: Sep. 26, 2023

(87) PCT Pub. No.: WO2023/185315
PCT Pub. Date: Oct. 5, 2023

(65) Prior Publication Data
US 2025/0085983 A1 Mar. 13, 2025

(30) Foreign Application Priority Data
Mar. 28, 2022 (CN) ......................... 202210311572.6

(51) Int. Cl.
*G06F 9/445* (2018.01)
*G06F 16/29* (2019.01)
*G06F 21/62* (2013.01)

(52) U.S. Cl.
CPC ............ *G06F 9/4451* (2013.01); *G06F 16/29* (2019.01); *G06F 21/6218* (2013.01)

(58) Field of Classification Search
CPC ..... G06F 9/4451; G06F 16/29; G06F 21/6218
(Continued)

(56) References Cited

U.S. PATENT DOCUMENTS 6,546,558 B1 * 4/2003 Taguchi .................. G06F 16/40 725/135
8,006,223 B2 * 8/2011 Boulineau ........ G06Q 10/06313 705/7.29
(Continued)

FOREIGN PATENT DOCUMENTS

CN 104183023 A 12/2014
CN 109767368 A 5/2019
(Continued)

OTHER PUBLICATIONS

Rhonda Glennon et al., "ArcGIS 9—Editing GIS Feature Tutorial", 2008, ESRI, 129 pages. (Year: 2008).*
(Continued)

*Primary Examiner* — Ted T. Vo

(57) ABSTRACT

A management method and apparatus for scenario data, an electronic device and a readable medium are disclosed, which belongs to the technical field of computers. The method includes: drawing corresponding scenario elements through various element drawing entries contained in a scenario editing interface; acquiring user private data stored in a private storage space through a private data access entry in the scenario editing interface; acquiring system public data stored in a public storage space through a public data access entry in the scenario editing interface; editing various drawn scenario elements based on user private data and system public data to obtain a scenario model; generating a scenario description file to be provided to a scenario analyzer for analyzing and loading in response to a received scenario saving instruction.

20 Claims, 5 Drawing Sheets

(58) Field of Classification Search
USPC .................................................. 717/104–113
See application file for complete search history.

(56) References Cited

U.S. PATENT DOCUMENTS

| | | | | |
|---|---|---|---|---|
| 12,136,134 | B2 * | 11/2024 | Budlong | G06F 3/04817 |
| 12,566,899 | B2 * | 3/2026 | Lachinski | G06F 30/13 |
| 2012/0133667 | A1 | 5/2012 | Lachoff | |

FOREIGN PATENT DOCUMENTS

| | | | |
|---|---|---|---|
| CN | 109861948 | A | 6/2019 |
| CN | 110377858 | A | 10/2019 |
| CN | 111798544 | A | 10/2020 |
| CN | 114721737 | A | 7/2022 |
| JP | 2005165873 | A | 6/2005 |

OTHER PUBLICATIONS

International Search Report for PCT/CN2023/077101 Mailed May 17, 2023.
Chen, Design and Realization of Substation Visualization Platform, Fu Jian Computer, No. 10, 2015, p. 120, DOI:10.16707/j.cnki.fjpc.2015.10.064.
Qu et al., Realization of Substation Visualization Training Platform, Journal Of Northeast Dianli University, vol. 34, No. 3, Jun. 2014, pp. 75-79, DOI:10.19718/j.issn.1005-2992.2014.03.015.
Office Action dated Jan. 15, 2025 for CN 202210311572.6 and English Translation.

* cited by examiner

MANAGEMENT METHOD AND APPARATUS FOR SCENARIO DATA, ELECTRONIC DEVICE, AND READABLE MEDIUM

CROSS-REFERENCE TO RELATED APPLICATIONS

The present application is a U.S. National Phase Entry of International Application No. PCT/CN2023/077101 having an international filing date of Feb. 20, 2023, which claims priority of the application No. 202210311572.6, filed to the CNIPA on Mar. 28, 2022. The above-identified applications are hereby incorporated by reference in their entireties.

TECHNICAL FIELD

The present disclosure belongs to the technical field of computers, in particular to a management method and apparatus for scenario data, a system, an electronic device and a readable medium.

BACKGROUND

Geographic Information System (GIS), also known as “Geoscience Information System”, belongs to a specific spatial information system. The system is used for collecting, storing, managing, calculating, analyzing, displaying and describing related geographical distribution data in the whole or part of the Earth’s surface (including the atmosphere) space with the support of computer hardware and computer software system.

For example, in urban, transportation, environmental protection and other professional field systems, it often needs to use geographic information data for display and data analysis. In order to meet the application requirements of the above scenarios, separate development for each scenario needs to be performed, which is time-consuming and laborious.

It can be seen that the scenarios developed in the existing GIS cannot be saved and reused, which increases the cost of scenario management and is not conducive to the rapid creation and editing of scenarios.

SUMMARY

The present disclosure is intended to provide a management method for scenario data, an apparatus, an electronic device and a readable medium.

A first aspect of the present disclosure provides a management method for scenario data, which includes:

- drawing corresponding scenario elements through various element drawing entries contained in a scenario editing interface, wherein the scenario editing interface contains multiple element drawing entries used for drawing different types of scenario elements;
- acquiring user private data stored in a private storage space through a private data access entry in the scenario editing interface; acquiring system public data stored in a public storage space through a public data access entry in the scenario editing interface;
- editing the various drawn scenario elements based on the acquired user private data and the acquired system public data, to obtain a scenario model containing multiple scenario elements; and
- acquiring element attribute information of the various scenario elements contained in the scenario model in response to a received scenario saving instruction, generating a scenario description file corresponding to the element attribute information of the various scenario elements based on a preset specification, and storing the scenario description file in the private storage space and providing the scenario description file to a scenario analyzer for analysis and loading.

A second aspect of the present disclosure provides a management method for scenario data, including:

- in response to a received scenario loading request, acquiring a scenario description file corresponding to the scenario loading request;
- analyzing the scenario description file based on a preset specification to obtain element attribute information of various scenario elements contained in a scenario model corresponding to the scenario description file; and
- loading and displaying the scenario model based on the element attribute information of the various scenario elements.

A third aspect of the present disclosure provides a management apparatus for scenario data, including: a drawing module, an acquisition module, an editing module and a generating module.

The drawing module is configured to draw corresponding scenario elements through various element drawing entries contained in a scenario editing interface, wherein the scenario editing interface contains multiple element drawing entries used for drawing different types of scenario elements.

The acquisition module is configured to acquire user private data stored in a private storage space through a private data access entry in the scenario editing interface; and acquire system public data stored in a public storage space through a public data access entry in the scenario editing interface.

The editing module is configured to edit the various drawn scenario elements based on the acquired user private data and the acquired system public data to obtain a scenario model containing multiple scenario elements.

The generating module is configured to acquire element attribute information of the various scenario elements contained in the scenario model in response to a received scenario saving instruction, generate a scenario description file corresponding to the element attribute information of the various scenario elements based on a preset specification, and store the scenario description file in the private storage space and provide the scenario description file to a scenario analyzer for analysis and loading.

A fourth aspect of the present disclosure provides a management apparatus for scenario data, including: an acquisition module, an analysis module and a loading module.

The acquisition module is configured to, in response to a received scenario loading request, acquire a scenario description file corresponding to the scenario loading request.

The analysis module is configured to analyze the scenario description file based on a preset specification to obtain element attribute information of various scenario elements contained in a scenario model corresponding to the scenario description file.

The loading module is configured to load and display the scenario model based on the element attribute information of the various scenario elements.

A fifth aspect of the present disclosure provides an electronic device including:

one or more processors;

a memory, having one or more programs stored thereon, when the one or more programs are executed by the one or more processors, the one or more processors are enabled to implement the method of any one of the above aspects; and one or more I/O interfaces, connected between the one or more processors and the memory and configured to implement information interaction between the one or more processors and the memory.

A sixth aspect of the present disclosure provides a computer readable medium on which a computer program is stored, wherein the method of any one of the above aspects is implemented when the program is executed by a processor.

BRIEF DESCRIPTION OF DRAWINGS

Accompanying drawings are used to provide a further understanding of the disclosure and constitute a part of the specification, and together with the following detailed description serve to explain the disclosure but does not constitute limitations on the present disclosure. In the drawings.

DETAILED DESCRIPTION

To make those skilled in the art better understand technical solutions of the present disclosure, the present disclosure is described in further details below with reference to the accompanying drawings and specific implementations.

Unless otherwise defined, technical terms or scientific terms used in the present disclosure should have the meanings as commonly understood by those of ordinary skills in the art that the present disclosure belongs to. The "first", "second" and similar terms used in the present disclosure do not indicate any order, quantity, or importance, but are used only for distinguishing different components. Similarly, similar words such as "a", "an" or "the" do not denote a limitation on quantity, but rather denote the presence of at least one. "Include", "contain", or similar words means that elements or objects appearing before the word cover elements or objects listed after the word and their equivalents, but other elements or objects are not excluded. "Connect", "couple", or a similar term is not limited to a physical or mechanical connection, but may include an electrical connection, whether direct or indirect. "Upper", "lower", "left", "right", etc., are used to represent relative position relations, and when an absolute position of a described object is changed, the relative position relation may also be correspondingly changed.

In a first aspect, an embodiment of the present disclosure provides a management method for scenario data. The management method realizes a flexible creation process of a scenario model based on the GIS system, and can realize a fast saving operation of the scenario model.

Figure 1:
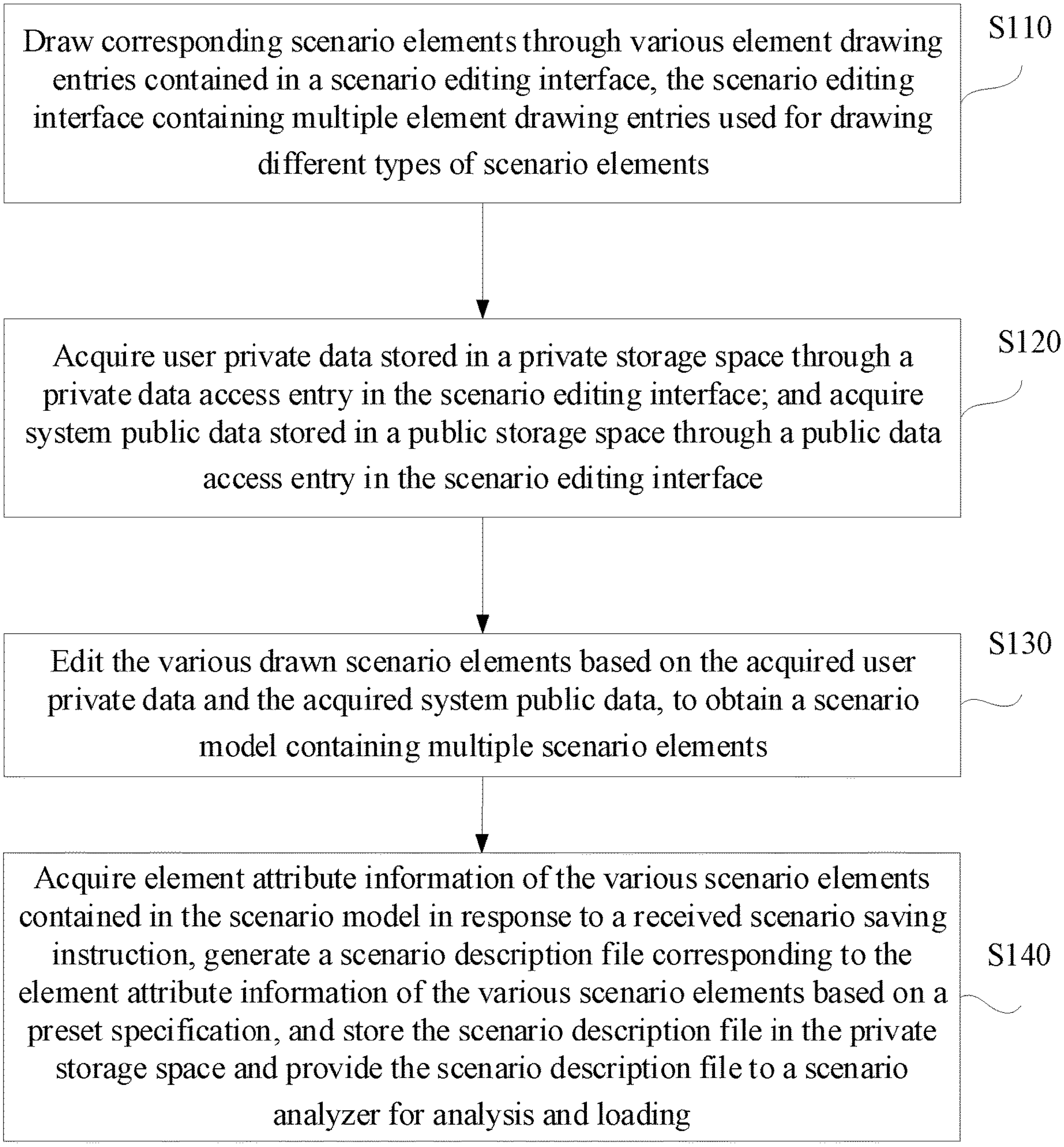
FIG. 1 is a flowchart of a management method for scenario data provided by one embodiment of the present disclosure.

As shown in FIG. 1, the management method for scenario data provided by an embodiment of the present disclosure may be applied to a GIS system. The method includes the following acts.

In act S110, corresponding scenario elements are drawn through various element drawing entries contained in a scenario editing interface, wherein the scenario editing interface contains multiple element drawing entries used for drawing different types of scenario elements.

The scenario editing interface is used for editing the created scenarios, and the scenario editing interface contains multiple element drawing entries for drawing different types of scenario elements, and corresponding types of scenario elements can be drawn through different element drawing entries.

GIS scenario contains multiple types of scenario elements, and various types of scenario elements together constitute a complete GIS scenario. For example, the scenario elements include: a base layer, map data, a 3D model, a vector graphic, etc. The present invention does not limit specific types of scenario elements and the quantity of scenario elements, and any module or unit that can be used to form a GIS scenario may be used as a scenario element.

In act S120, user private data stored in a private storage space is acquired through a private data access entry in the scenario editing interface; and system public data stored in a public storage space is acquired through a public data access entry in the scenario editing interface.

The user private data refers to personal data belonging to a current logged-in users. The user private data of each logged-in user is used for himself, and other users usually have no authority to access it. By setting the user private data, it is convenient to flexibly manage the personalized data of various users. Personalized data of users may be stored through user private data, such as facility data in user's company, building data near user's home, etc. In addition, the user private data is stored in the private storage space, which can only be accessed according to the user identification of the corresponding user, and other users have no access authority.

In the GIS system, in addition to the stored user private data uploaded by the user in advance, the system public data which may be shared by various logged-in users is also provided. Different from the access mode of user private data, the system public data may be accessed by all users. Through the system public data, the conventional data in a process of drawing a map may be stored, such as public roads, public buildings and other public contents. The system public data is stored in the public storage space, and various users can access it through the public data access interface.

In act S130, various drawn scenario elements are edited based on the acquired user private data and system public data, to obtain a scenario model containing multiple scenario elements.

Each scenario element contains a variety of information. For example, taking a scenario element of a 3D model type as an example, in order to accurately describe various parts of the 3D model, corresponding model resources need to be loaded. Different model resources may be stored in the private storage space and the public storage space, respectively. Correspondingly, based on the acquired user private data and system public data, various drawn scenario elements are edited to obtain a scenario model composed of various scenario elements.

In act S140, element attribute information of various scenario elements contained in the scenario model is acquired in response to a received scenario saving instruction, a scenario description file corresponding to the element attribute information of various scenario elements is generated based on a preset specification, and the scenario description file is stored in the private storage space and provided to a scenario analyzer for analysis and loading.

The scenario saving instruction may be of multiple types, such as a cloud saving instruction, or local saving instruction. The preset specification is used to define a data format and storage mode of the scenario description file. In the present disclosure, the preset specification for generating the scenario description file is defined in advance, and various types of scenario contents can be uniformly stored through the preset specification. The scenario description file stores the element attribute information of various scenario elements contained in the scenario model.

Accordingly, the scenario analyzer may analyze and load the scenario description file, so as to quickly restore the scenario model configured by the user.

It can be seen that this method stores user private data and system public data separately, which is convenient to set different data access authorities for different users, and achieves the purpose of isolating and protecting user private data. When scenario data is loaded, only the user private data related to the scenario and the system public data in the view port are loaded, which improves the data reuse degree, reduces the data loading amount and improves the scenario rendering speed. In addition, by presetting the preset specification, the scenario model can be stored as a standardized scenario description file, so that the corresponding scenario can be quickly analyzed and restored by the scenario analyzer, so as to realize the scenario management operation, further realize the scenario reuse and reduce the scenario management cost.

In a second aspect, an embodiment of the present disclosure provides a management method for scenario data, which realizes analyzing and loading process of a scenario description file based on the GIS system or other service systems, and can realize rapid loading of a scenario model.

Figure 2:
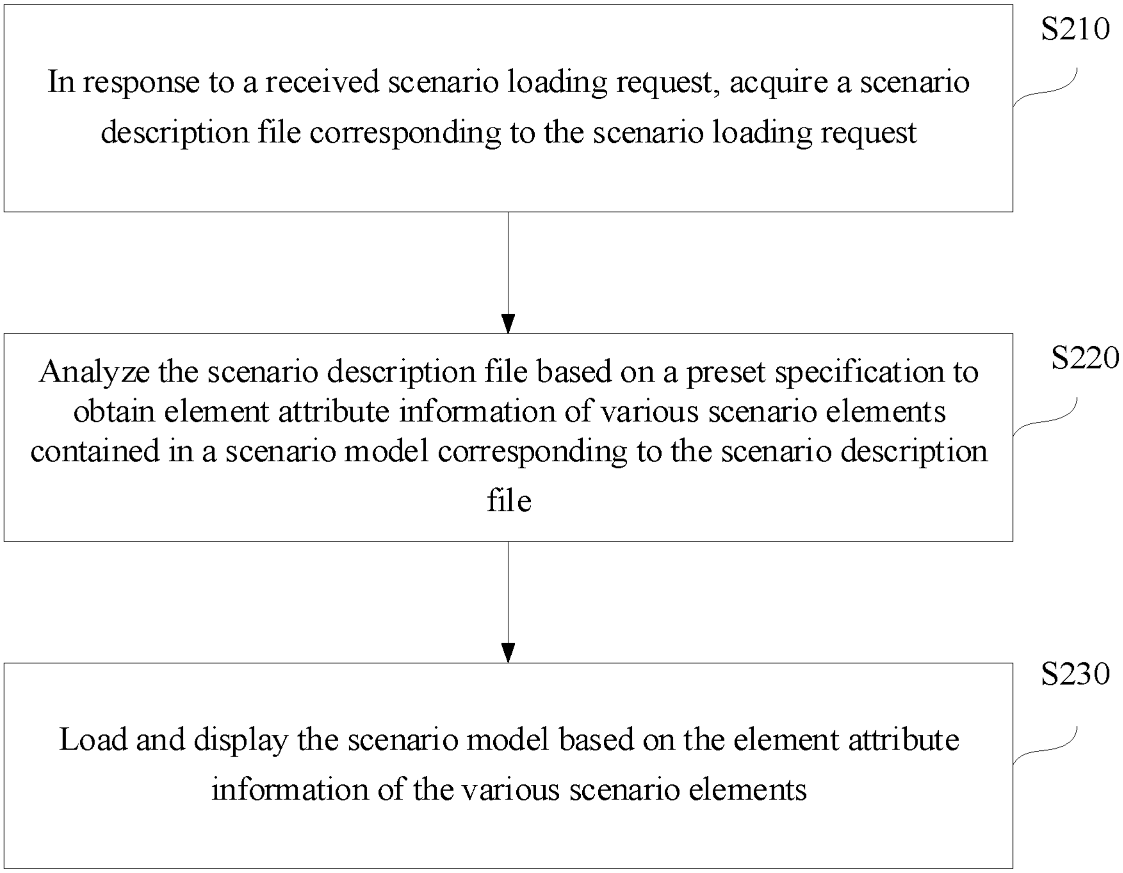
FIG. 2 is a flowchart of a management method for scenario data provided by another embodiment of the present disclosure.

As shown in FIG. 2, the management method for scenario data provided by an embodiment of the present disclosure may be applied to the GIS system or other service systems. The method includes the following acts.

In act S210, in response to a received scenario loading request, a scenario description file corresponding to the scenario loading request is acquired.

The scenario loading request may be triggered by a scenario loading entry in the GIS system, or it may also be triggered by a scenario loading entry in a service system. The service system can communicate with the GIS system, and is used to realize the specified service function by means of map data.

The scenario description file may be generated in a manner shown in the embodiment of FIG. 1. The scenario description file may be either a locally stored file or a cloud stored file, which may be acquired through a scenario identification contained in the scenario loading request.

In act S220, the scenario description file is analyzed based on a preset specification to obtain element attribute information of various scenario elements contained in a scenario model corresponding to the scenario description file.

The preset specification is used to define a data format and storage mode of the scenario description file. In the present disclosure, the preset specification for generating the scenario description file is defined in advance, and the element attribute information of various types of scenario elements can be uniformly stored through the preset specification. Accordingly, the scenario analyzer can parse and load the scenario description file, so as to quickly restore the scenario model configured by the user. The scenario analyzer can be provided in the GIS system or the service system, to realize the functions of analyzing and loading the scenario description file.

In act S230, the scenario model is loaded and displayed based on element attribute information of various scenario elements.

In order to facilitate users to perform management operations, such as browsing and performing second editing the scenario model, the loaded scenario model is displayed in the system interface in this act.

It can be seen that this method can quickly analyze the scenario description file through the scenario analyzer by presetting the preset specification, so as to restore the corresponding scenario model, and facilitate the management operations such as modifying and editing the scenario model, realize the reuse of scenarios, and reduce the cost of scenario management.

In a third aspect, an embodiment of the present disclosure provides a management method for scenario data to realize the process of generating, analyzing and loading a scenario description file, and can realize the rapid loading of a scenario model.

Figure 3:
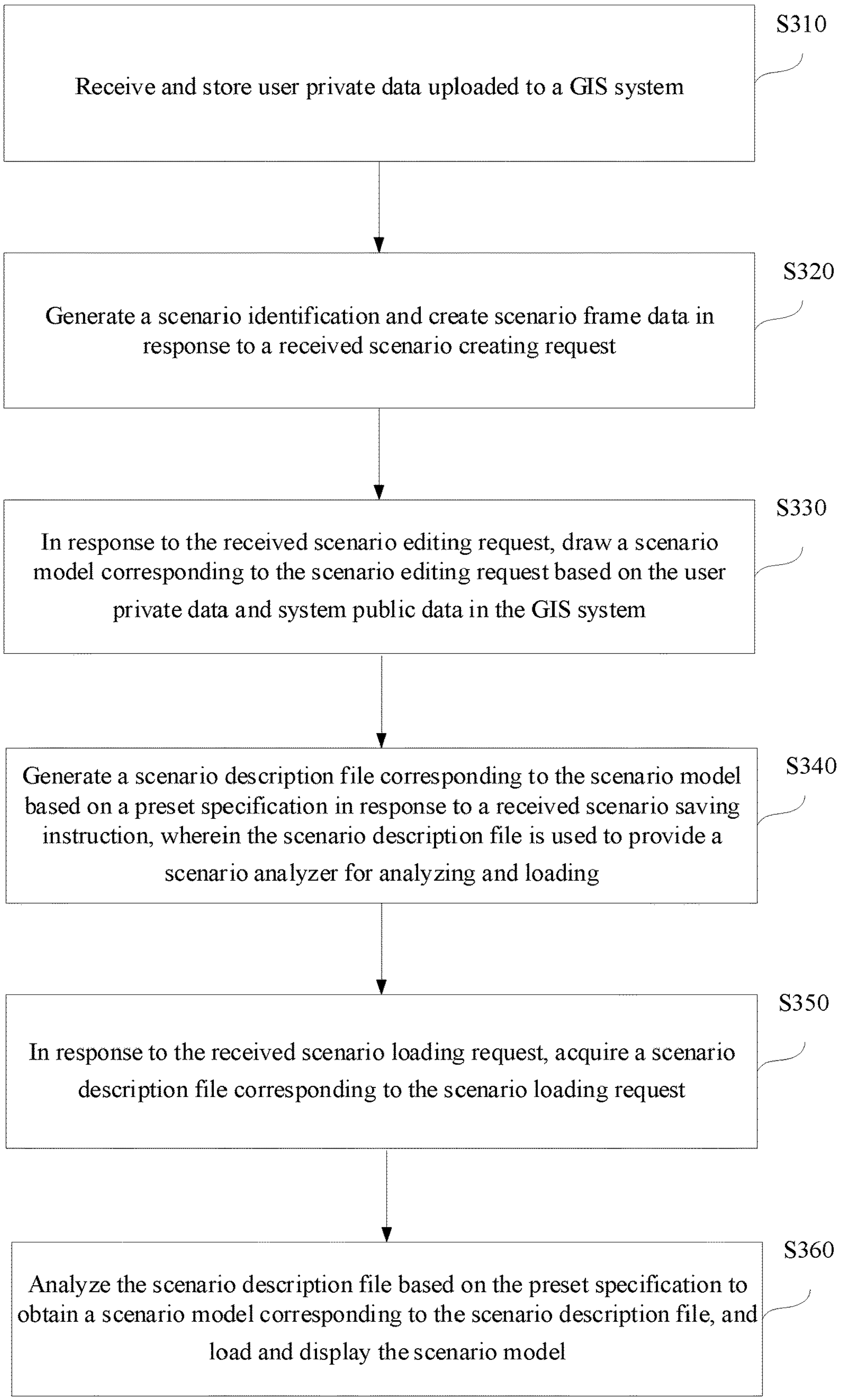
FIG. 3 is a flowchart of a management method for scenario data provided by yet another embodiment of the present disclosure.

As shown in FIG. 3, the management method for scenario data provided by an embodiment of the present disclosure may be applied to the GIS system or other service systems. The embodiment shown in FIG. 3 is intended to provide a more detailed description of the embodiments shown in FIG. 1 and FIG. 2. The method includes the following acts.

In act S310, user private data uploaded to the GIS system is received and stored.

In this embodiment, hierarchy management is performed on geographic information data, and the hierarchy management means that the user private data and the system public data are stored in different data storage spaces respectively, to realize the management for different access authorities. For example, the user private data is stored in a private storage space, and the system public data is stored in a system public space. In addition, in order to prevent the user private data from being maliciously accessed by other users, in this embodiment, the private storage space further includes multiple user private spaces respectively corresponding to different users, wherein, the user private spaces of different users are isolated from each other, each user private space can only be accessed through a corresponding user identification, and other users have no access authority.

The system interface of the GIS system includes a private data uploading entry, through which user private data can be uploaded to the GIS system. The user private data may also be called material data, which may be specifically stored in the user private space corresponding to the user account. For example, in response to the received private data uploading request, the user identification and the user private data contained in the private data uploading request are acquired; the user private data is stored in the user private space, corresponding to the user identification, in the private storage space. The private data uploading request is triggered by the private data uploading entry.

In an alternative implementation, the user private data is user material, specifically which is stored in a material management library and uploaded through a material management entry. First, the GIS system is deployed to the user's machine by means of either an installation package or a mirror deployment. Then, a user is registered in the GIS system. Finally, the user private data is uploaded to the material management library for subsequent acts. The material may be a picture, 3D model, json data file or so on.

For example, there is a "material management" entry in the system interface of the GIS system, and a user can upload the material and set the material type by clicking on this entry.

In act S320, a scenario identification is generated and scenario frame data is created in response to a received scenario creating request.

This act is mainly used to implement a scenario creating operation, so as to create a user scenario corresponding to the scenario identification. This scenario is usually a customized scenario, which is stored in the user private space after it is created.

The scenario creating request may be triggered by a "scenario management" entry provided in the system interface, and a scenario creating interface is displayed in the system interface in response to the received scenario creating request. The scenario creating interface includes a scenario name setting entry and a scenario introduction setting entry for setting auxiliary description information of scenarios, so as to quickly filter available scenarios from multiple created scenarios through the auxiliary description information.

In addition, in this act, based on the scenario creating request, the scenario identification is generated, and the scenario frame data is created. The scenario frame data is used to implement building of the frame of the scenario, to show a general outline of the scenario. Multiple types of scenario frame data corresponding to different types of scenarios may be set in advance, thereby creating scenario frame data corresponding to the scenario type according to the scenario type included in the scenario creating request.

In act S330, in response to the received scenario editing request, a scenario model corresponding to the scenario editing request is drawn based on the user private data and the system public data in the GIS system.

In the GIS system, in addition to the stored user private data uploaded by the user in advance, the system public data which may be shared by various logged-in users is also provided. Different from the access mode of the user private data, the system public data may be accessed by all users. Through the system public data, the conventional data in the process of drawing a map may be stored, such as public roads, public buildings and other public contents. Accordingly, the scenario model is generated based on the user private data and the system public data.

Figure 4:
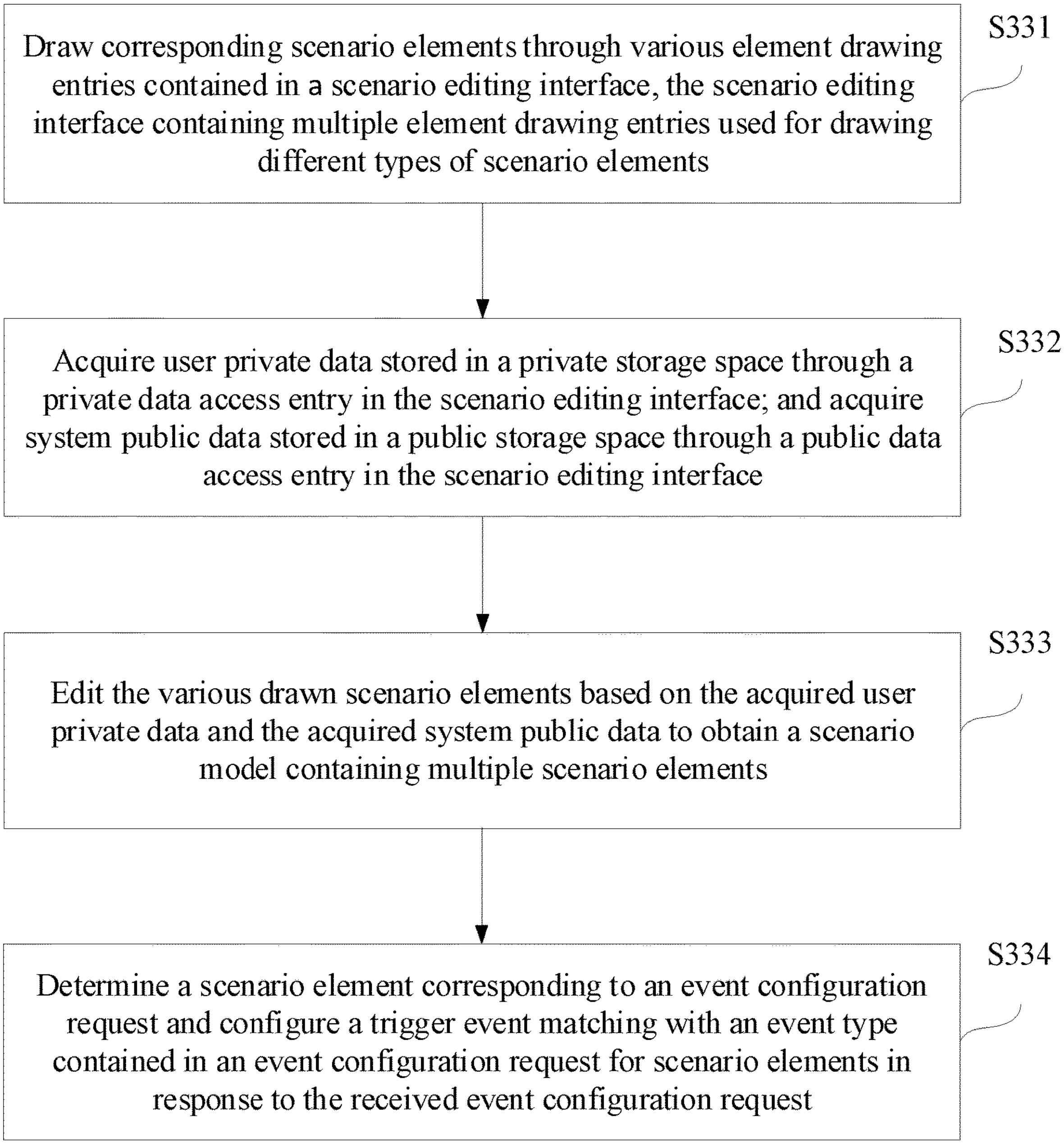
FIG. 4 is a flowchart of a specific implementation of act S330.

The scenario editing request is used for implementing editing operations aiming at the created scenarios, and specifically includes an editing starting request for entering the scenario editing interface, an element drawing request for drawing different types of scenario elements, an element editing request for editing various drawn elements, and an event configuration request for configuration events aiming at the scenario elements. Accordingly, act S330 further includes the sub-acts shown in FIG. 4. As shown in FIG. 4, act S330 includes the following sub-acts.

In sub-act S331, corresponding scenario elements are drawn through various element drawing entries contained in a scenario editing interface, wherein the scenario editing interface contains multiple element drawing entries used for drawing different types of scenario elements.

The scenario editing interface is displayed in response to the received editing starting request. In response to an element drawing request triggered by an element drawing entry included in the scenario editing interface, an element type identification included in the element drawing request is acquired, and a scenario element corresponding to the element type identification is drawn. The scenario elements are drawn based on the scenario frame data.

In one example, the scenario elements include at least one of the following nine types: a base layer, map data, a road network, a vector graphic, a 3D model, a data visualization, an event, a special effect, and a view. Correspondingly, element drawing entries for drawing scenario elements of different types include: a first element drawing entry for drawing scenario elements of the base layer type (base layer drawing entry), a second element drawing entry for drawing scenario elements of the map data type (map data drawing entry), a third element drawing entry for drawing scenario elements of the road network type (road network drawing entry), a fourth element drawing entry for drawing scenario elements of the vector graphic type (vector graphic drawing entry), a fifth element drawing entry for drawing scenario elements of a 3D model type (3D model drawing entry), a sixth element drawing entry for drawing scenario elements of data visualization type (data visualization drawing entry), a seventh element drawing entry for drawing scenario elements of the event type (event drawing entry), an eighth element drawing entry for drawing scenario elements of the special effect type (special effect drawing entry), and a ninth element drawing entry for drawing scenario elements of the view type (view drawing entry). In this example, nine types of scenario elements are preset, and an entry list area is provided in the scenario editing interface, and various element drawing entries are displayed in the entry list area, and the user may select the corresponding drawing entry according to the type of scenario element to be drawn. In addition, the scenario editing interface also includes a scenario image drawing area, which is used for displaying the scenario model composed of various scenario elements drawn by the user in real time. By presetting a variety of scenario elements, and setting corresponding drawing entries for various scenario elements respectively, various complex scenarios can be flexibly drawn with the scenario element as the basic unit. A GIS scenario is composed of multiple different types of scenario elements.

In sub-act S332, user private data stored in a private storage space is acquired through a private data access entry in the scenario editing interface; and system public data stored in a public storage space is acquired through a public data access entry in the scenario editing interface.

The scenario element still usually needs to contain corresponding element resource data. For example, taking a scenario element of the 3D model type as an example, corresponding element resource data needs to be added for the 3D model, and the element resource data includes file resource data, video resource data, picture resource data, or so on.

In order to configure the corresponding element resource data for the scenario element, it needs to access the user private data and the system public data mentioned above. Because the two kinds of data are stored in isolation, when accessing, it needs different access entries, pointing to different storage spaces, in a front-end interface, so as to acquire corresponding data.

For example, in response to a private data access request triggered by the private data access entry in the scenario editing interface, a user identification of a current user included in the private data access request is acquired, and a private data access interface is called to access the user private space corresponding to the user identification to acquire the user private data. In another example, in response to a public data access request triggered by the public data access entry in the scenario editing interface, the public data access interface is called to access the public storage space to acquire the system public data.

In sub-act S333, various drawn scenario elements are edited based on the acquired user private data and system public data, to obtain a scenario model containing multiple scenario elements.

The scenario element contains different kinds of element resource data, and the different element resource data may be provided by the user private data and the system public data respectively. Therefore, in this act, based on the acquired user private data and system public data, various drawn scenario elements are edited to obtain a scenario model containing multiple scenario elements. It can be seen that scenario elements are edited according to the user private data and the system public data, and the scenario model is composed of multiple scenario elements.

In sub-act S334, a scenario element corresponding to an event configuration request is determined in response to the received event configuration request, and a trigger event matching with the event type contained in the event configuration request is configured for the scenario element.

The sub-act S334 is an optional act, and the sub-act S334 may also be omitted in other embodiments.

With the sub-act S334, a response event can be added to the scenario model, which is usually triggered for one or more scenario elements in the scenario model. The event configuration request may be triggered by the event drawing entry mentioned above, or may also be triggered by other means, which is not limited in the present invention. The event interface is configured for the scenario element, and event-associated data corresponding to the trigger event is bound with the event interface to configure the event type of the trigger event through the event interface. Thus, in this embodiment, an event interface is configured for a specific scenario element, and the event interface is bound to the event-associated data. The event-associated data refers to all kinds of data related to a trigger event, such as monitoring data after the trigger event is initiated, alarm data when alarm processing following the initiation of trigger event is performed, alarm strategies, etc. The event type includes a monitoring type and a prediction type. Accordingly, the event-associated data corresponding to the trigger event includes at least one of the followings: monitoring object data, monitoring strategy data and event response result data, of the trigger event. For example, if the event type is the monitoring type, when the trigger event that matches with the event type contained in the event configuration request is configured for the scenario element, the following information of the trigger event is configured through the event interface: a monitoring object, a monitoring strategy, and an event response result. The event interface is used for setting event attribute information of the trigger event, including at least one of the followings: a monitoring object, monitoring strategy and event response result of the trigger event.

The scenario model in this embodiment may be applied to an application scenario of a digital twin city. Through the digital twin city, the sceneries such as buildings, vehicles and water systems in the real world can be presented in a three-dimensional virtual space in a virtual reality mode, and the digital twin scenario, also called a virtual world, is produced, thereby rendering the positioning attributes, addresses and position information of a three-dimensional model of each city.

In an alternative implementation, a trigger event is configured for the scenario object, the 3D model contained in the scenario model, to realize a fire monitoring function. For example, a trigger event is configured for a fire protection system in the 3D model, the event type of the trigger event is the monitoring type, and the event-associated data includes: monitoring object data (for example, an environmental temperature value of the fire protection system, specifically the monitored value is acquired through a temperature monitor), monitoring strategy data (for example, the monitoring strategy is to acquire a monitoring value of the temperature monitor every 10 seconds, and compare the monitoring value with a preset fire temperature threshold to determine whether the monitoring value is greater than the preset fire temperature threshold), and event response result data (for example, if the monitoring value is greater than the preset fire temperature threshold, it is to control a display mode of the 3D model to change, such as changing the color of the 3D model, or displaying a flame element in the 3D model, to play a warning role).

In another alternative implementation, a trigger event is configured for a scenario object, a 3D model contained in the scenario model, to realize a prediction function of a machine life. For example, a trigger event is configured for a factory machine in the 3D model, and the event type of the trigger event is a prediction type. The event-associated data includes monitoring object data (for example, the use time of the machine), monitoring strategy data (for example, the monitoring strategy is to compare the use time of the machine with a preset life threshold to determine whether the use time is greater than the preset life threshold), and event response result data (for example, if an absolute value of a difference between the use time and the life threshold is less than a preset value, the color of the machine is changed, to play a warning role). In addition, in the prediction process, multiple parameters associated with the machine may be acquired further in combination with a pre-trained deep learning model, so as to predict the machine life more accurately by combining the parameter values of the multiple parameters.

For another example, a response event may be added for a scenario element of a rainfall monitor, and a monitoring object of the monitoring event is configured as rainfall through the event interface. The monitoring strategy is to acquire a rainfall monitoring result every 5 minutes, and the event response result is to warn when the rainfall monitoring result is greater than a preset value.

In a specific example, the scenario editor provided by the GIS system is used to visually edit the scenario model, including drawing ground objects, roads, adding 3D models, visualizing data, special effects, configuring views, editing key frames and so on.

In act S340, a scenario description file corresponding to the scenario model is generated based on the preset specification in response to a received scenario saving instruction, wherein the scenario description file is provided to a scenario analyzer for analyzing and loading.

In a case where the scenario saving instruction is received, element attribute information of various scenario elements contained in the scenario model is acquired, a scenario description file corresponding to the element attribute information of various scenario elements is generated based on a preset specification, and the scenario description file is stored in the user private space, and is provided to a scenario analyzer for analysis and loading.

The scenario saving instruction may be of multiple types, such as a cloud saving instruction or local saving instruction. First, element attribute information of various scenario elements contained in the scenario model is determined respectively, and element description data for describing the attribute information of various elements is generated based on the preset specification. Then, a scenario description file is generated according to the element description data of attribute information of various elements. The element attribute information includes at least one of the followings: an element identifier, an element type, an element size, an element orientation, element extension data, and an element loading mode. The preset specification is used to define a format of the scenario description file, and is specifically used to define a mapping relationship between the element attribute information of the scenario element and the description specification in the scenario description file.

In a first implementation mode, the scenario saving instruction includes a cloud saving instruction. Correspondingly, the scenario description file and the scenario identification are associated and stored in a cloud database through a cloud saving entry. For example, when the user clicks on the Save button, the GIS system analyzes the current scenario, generates scenario description data in the scenario description file according to the scenario configuration specification (i.e., the preset specification), and saves it in the user private space of the cloud database.

In a second implementation mode, the scenario saving instruction includes a local saving instruction. Correspondingly, the scenario description file is exported and stored in the user private space of the local database through a local saving entry. For example, when the user clicks on the export button, the GIS system generates the scenario description data according to the scenario configuration specification and exports it into a json file.

In act S350, in response to a received scenario loading request, a scenario description file corresponding to the scenario loading request is acquired.

In one implementation, the scenario loading request includes: a cloud loading request. Correspondingly, a scenario identification contained in the scenario loading request is acquired, and a scenario description file corresponding to the scenario identification is acquired from the cloud database based on the scenario identification.

In another implementation, the scenario loading request includes a local loading request. Correspondingly, according to the scenario identification contained in the scenario loading request, a scenario description file corresponding to the scenario identification stored locally is acquired.

In act S360, the scenario description file is analyzed based on the preset specification, to obtain a scenario model corresponding to the scenario description file, and the scenario model is loaded and displayed.

The scenario description file is analyzed based on the preset specification to obtain the element attribute information of various scenario elements contained in the scenario model corresponding to the scenario description file; based on the element attribute information of various scenario elements, the scenario model is loaded and displayed. For example, the element description data contained in the scenario description file is acquired, and element attribute information of various scenario elements corresponding to the element description data is determined based on the preset specification. The element attribute information includes at least one of the followings: an element identifier, an element type, an element size, an element orientation, element extension data, and an element loading mode. In addition, the element description data is used for storing the element attribute information of the scenario elements in the format defined by the preset specification. Accordingly, the scenario description file is stored in the user private space and is composed of element description data, and the element description data follows the preset specification described above.

Thus, the element attribute information of the scenario element is described according to the preset specification to obtain the element description data, and the scenario description file is composed of the element description data.

In one implementation, when the scenario model is loaded and displayed, various scenario elements contained in the scenario model is acquired, the scenario element configured with a trigger event is determined as a target scenario element, and a trigger event matching with the event type corresponding to the target scenario element is generated. Specifically, an event interface configured for the target scenario element is determined, event-associated data bound with the event interface is acquired, and the trigger event is generated according to the event-associated data. The event type includes a monitoring type and a prediction type, and the event associated data bound with the event interface includes at least one of the followings: monitoring object data, monitoring strategy data and event response result data, of a trigger event. When the scenario loading request is a cloud loading request (corresponding to a situation in which the scenario saving instruction is a cloud saving instruction), when the user uses a scenario, a scenario analyzer is added to the service system by using an embedded framework (such as web iframe), and the scenario identification is specified in URL. The analyzer will acquire the scenario description data from the GIS system according to the scenario identification and analyze it, and finally display it in the service page.

When the scenario loading request is a local loading request (corresponding to a situation in which the scenario saving instruction is a local saving instruction), when the user uses off-line data, a scenario analyzer is included in the service system by using the embedded framework, and the json file data is sent to the analyzer in the iframe framework by using the communication mechanism such as postMessage, and the analyzer analyzes the scenario description data, and finally displays it in the service page.

In one implementation, acts S350 to S370 are implemented by the GIS system. In yet another implementation, acts S350 to S370 are performed by a service system capable of communicating with the GIS system. And, in the latter mode, the scenario analyzer provided in the service system analyzes the scenario description file to obtain a scenario model corresponding to the scenario description file. In addition, with the service system, additional functions such as monitoring and querying can be carried out on the loaded scenario model. For example, if the element attribute information includes the element extension data, the element extension data of various scenario elements may be queried and displayed in the service system to provide reference for users. The element extension data includes: auxiliary description information of the scenario elements.

The loading mode based on cloud storage can uniformly manage user's scenario models through the cloud database, which is beneficial for reducing the management cost of user-side equipment. The loading mode based on local storage enables the scenario models to be directly stored in a local location without through the cloud. For some data with high security, it can avoid the risk of malicious interception during transmission. The above two storage modes can be flexibly set based on the security requirements of service scenarios.

The above embodiments may be implemented based on WebGL (i.e. Web Graphic Library), wherein WebGL is a JavaScript API that can render high-performance interactive 3D or 2D graphics in any compatible Web browser without the use of plug-ins. WebGL realizes this by introducing an API that is very consistent with OpenGL ES 2.0, and this API may be used in HTML5<canvas> elements. This feature enables the API to utilize a hardware graphic acceleration function provided by user equipment, thus improving the model drawing speed.

The above embodiments can solve the deficiencies and defects existing in a current situation where multiple developments are needed for similar requirements, and provides a management system capable of describing geographic information scenarios, which has the advantages of clear flow, time saving, labor saving, easy maintenance, rapid updating and the like, can effectively improve work efficiency, and meet the requirements of display and calculation and analysis of various geographic information data.

In this embodiment, the hierarchy management of the geographic information data is realized by using a hierarchy model of the geographic information data. The geographic information data in an actual scenario is divided into three categories: system public data (i.e. public data), user private data (e.g. user static data) and scenario specific data (i.e. scenario description file corresponding to a scenario model). The system public data is provided by the GIS system; the user private data is uploaded by users and can only be accessed by users themselves. In various use scenarios, scenario-specific data can be generated based on the system public data and the user private data, that is, scenario data that conforms to a geographic information scenario description language specification.

The following is a detailed description of the data types stored in various layers in a data hierarchy model in a specific example:

One data layer of the data hierarchy model is a user private data layer, which stores the following types of data: map management data, road network data, terrain data, urban building data, water system data, vector data, area division data, indoor map data, POI data, material data, data interface, BIM, CIM, equipment data and control interface.

Another data layer of the data hierarchy model is a system public data layer, also called a basic data and capability layer, which stores the following types of data: map basic data, 3D terrain data, map perspective operation, map layer, map control, 3D tile hosted workflow, online map layer, vector data support, event engine, model support, GeoJSON support, POI interest point, map object, data visualization, video fusion, scenario roaming, path planning, underground pipe network, urban white model, model monomerization, scenario background sky box, weather special effect, spatial analysis and calculation, BIM model analysis and virtual simulation.

Accordingly, based on the user private data layer and the system public data layer, combined with the spatio-temporal data configuration description, the above-mentioned scenario-specific data (i.e., the scenario description file corresponding to the scenario model) may be obtained. The scenario-specific data specifically includes the following types of data: map parameter configuration, cover attributes (customizable), event triggering, data binding, visual data, 3D model, interactive element, navigation, perspective, story, chart, action, special effect, and material reference.

In this embodiment, the generation and analysis operation of the scenario description file is realized through the preset specification, which is also called the geographic information scenario description language specification. The specification abstracts the geographic information scenario into nine data types: a basic layer, user map, road network, vector graph, view, 3D model, event, special effect and data visualization, and organizes them in the way of a json object. Each data type is a list including data elements, which may correspond to corresponding ground objects on the map, and their configuration may be described by json objects. If there are more requirements later, these nine data types may be extended to support more scenarios. After users save the scenario data or export the scenario data into files by using the visual scenario editor of the GIS system, the scenario data conforming to this specification is formed, which may be read by the scenario analyzer of the GIS system to restore the geographical scenario for display.

For example, to describe a three-dimensional object on the ground, a possible configuration is:

```
{
  id: 'f1',
  type: 'model',
  url: '/f1.glb',
  position: [117.22943561049438, 29.29803357476772, 0],//[longitude, latitude,
altitude]
  //hpr or configure heading, pitch, roll separately. The latter has a higher priority.
  hpr: [96, 0, 0],   //[rotation angle, pitch angle, flip angle]
  heading: 96,
  pitch: 0,
  roll: 0,
```

-continued

```
draggable: true,
   focusable: true,
   data: { }
}
```

The configuration of other data is similar.

An overall description file is as follows:

```
[
   {
      "label": "Base Layer",
      "leaf": false,
      "data": null,
      "children": [/* Similar configuration is omitted */]
   },
   {
      "label": "Map data",
      "leaf": false,
      "data": null,
      "children": [/* Similar configuration is omitted */]
   },
   {
      "label": "Road network",
      "leaf": false,
      "data": null,
      "children": [/* Similar configuration is omitted */]
   },
   {
      "label": "Vector graphic",
      "leaf": false,
      "data": null,
      "children": [/* Similar configuration is omitted */]
   },
   {
      "label": "3D model",
      "leaf": false,
      "data": null,
      "children": [
{
         id: 'f1',
         type: 'model',
         url: '/f1.glb',
         position: [117.22943561049438, 29.29803357476772, 0],//[longitude,
latitude, altitude]
         //hpr or configure heading, pitch, roll separately. The latter has a higher
priority.
         hpr: [96, 0, 0], //[rotation angle, pitch angle, flip
angle]
         heading: 96,
         pitch: 0,
         roll: 0,
   draggable: true,
         focusable: true,
         data: { }
      }
]
   },
   {
      "label": "Data visualization",
      "leaf": false,
      "data": null,
      "children": [/* Similar configuration is omitted */]
   },
   {
      "label": "Event",
      "leaf": false,
      "data": null,
      "children": [/* Similar configuration is omitted */]
   },
   {
      "label": "Special effect",
      "leaf": false,
      "data": null,
      "children": [/* Similar configuration is omitted */]
   },
   {
```

-continued

```
      "label": "View",
      "leaf": true,
      "data": {
        "position": [
          -82.50000000000001,
          35.16147598245406,
          21552825.994244386
        ],
        "hpr": [
          360,
          -89.88065589068933,
          0
        ],
        "sun": true
      }
    }
]
```

In a word, in a scenario data generation flow described in this embodiment, based on the geographic information data hierarchy model and the scenario description language specification, the GIS system generates scenario description data according to the visual scenario configured by the user, and the scenario description data is used for displaying the scenario. The specific process includes the following operations: performing hierarchy management on geographic information data, uniformly and abstractly describing GIS data used by users, and forming geographic information scenario description language specification. Using industry cloud GIS system to visually edit geographic information, the user GIS scenario description data is generated and stored. When the user GIS scenario description data will be used, the scenario data is acquired by using the scenario data identification or imported by using off-line files, so that the scenario data is input into the GIS system to restore the scenario.

Through the scheme in this embodiment, at least the following beneficial effects are obtained: firstly, geographic information data can be managed effectively by using the data hierarchy model, user private data is isolated, the amount of scenario data is reduced, and the loading speed is improved; secondly, static map data is hosted in the cloud to achieve decentralized loading and on-demand loading, so as to improve loading and running speed, and optimize user experience; thirdly, the GIS scenario is described based on the specification, the configured data is generated, and the GIS system is used for uniform management, which avoids the disadvantages that every scenario needs to be developed, and improves work efficiency; finally, a lightweight cloud scenario management scheme and a scenario file management scheme suitable for off-line environment are provided, which are suitable for both online and off-line scenarios and multiple terminals, has stronger adaptability and can meet various use scenarios. In addition, a uniform specification for describing geographic information scenarios is provided, which makes various scenario data standardized and easier to manage.

By means of configuring an event, this scheme can realize the functions such as monitoring or predicting, can load the scenario model of the GIS system into the service system, and realize the functions of monitoring or predicting by combining the characteristics of the service system. Moreover, the auxiliary description information of the elements can be queried in the service system by means of element expansion data, thus adding the contents needed in the service system to the scenario model of the GIS system in the way of element expansion data, thereby providing convenience for the use of the service system. The service system may be the digital twin city system mentioned above, and may also be various systems that need to be matched with the GIS model, such as a population migration prediction system.

Figure 5:
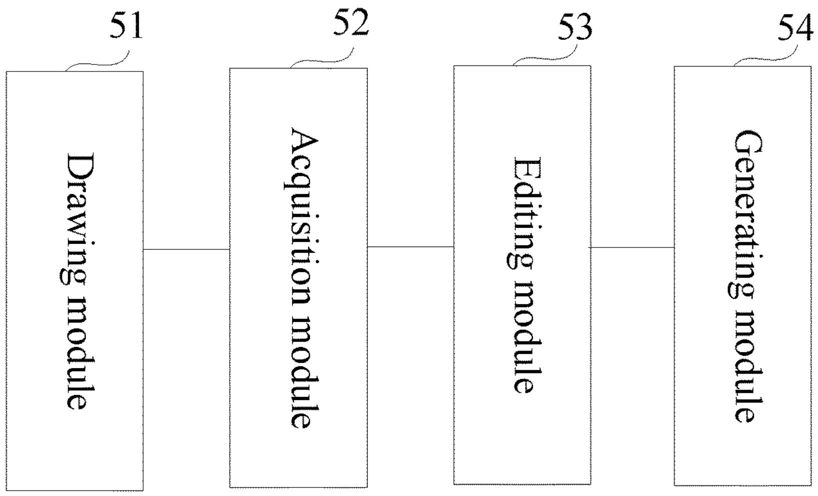
FIG. 5 illustrates a schematic diagram of a structure of a management apparatus for scenario data provided by another embodiment of the present disclosure.

FIG. 5 illustrates a schematic diagram of a structure of a management apparatus for scenario data provided by another embodiment of the present disclosure. As shown in FIG. 5, the management apparatus includes: a drawing module 51, an acquisition module 52, an editing module 53 and a generating module 54.

The drawing module 51 is configured to draw corresponding scenario elements through various element drawing entries contained in a scenario editing interface, wherein the scenario editing interface contains multiple element drawing entries used for drawing different types of scenario elements.

The acquisition module 52 is configured to acquire user private data stored in a private storage space through a private data access entry in the scenario editing interface; and acquire system public data stored in a public storage space through a public data access entry in the scenario editing interface.

The editing module 53 is configured to draw various drawn scenario elements based on the acquired user private data and system public data, to obtain a scenario model containing multiple scenario elements.

The generating module 54 is configured to acquire element attribute information of various scenario elements contained in the scenario model in response to a received scenario saving instruction, generate a scenario description file corresponding to the element attribute information of various scenario elements based on a preset specification, and store the scenario description file in the private storage space and provide the scenario description file to a scenario analyzer for analysis and loading.

Optionally, the private storage space further includes: multiple user private spaces respectively corresponding to different users; the acquisition module is specifically configured to determine a user private space corresponding to a current user in the private storage space according to a user identification, and acquire the user private data from the user private space corresponding to the current user.

The apparatus further includes: an uploading module, configured to acquire a user identification and user private data contained in a private data uploading request in response to the received private data uploading request; and store the user private data in the user private space, corresponding to the user identification, in the private storage space.

Optionally, the apparatus further includes: a configuration module configured to determine a scenario element corresponding to an event configuration request and configure a trigger event matching with an event type contained in the event configuration request for the scenario element in response to the received event configuration request.

Optionally, the configuration module is specifically configured to configure an event interface for the scenario element, and bind event-associated data corresponding to the trigger event with the event interface to configure the event type of the trigger event through the event interface.

Optionally, the event type includes a monitoring type and a prediction type; the event-associated data corresponding to the trigger event includes at least one of the followings: monitoring object data, monitoring strategy data and event response result data, of the trigger event.

Optionally, the generation module is specifically configured to determine element attribute information of various scenario elements contained in the scenario model respectively, generate element description data corresponding to the element attribute information of the scenario elements based on the preset specification, and generate the scenario description file according to the element description data.

The element attribute information includes at least one of the followings: an element identifier, an element type, an element size, an element orientation, element extension data, and an element loading mode.

Optionally, the scenario saving instruction includes a cloud saving instruction, and the generating module is specifically configured to associate and store the scenario description file and the scenario identification in a user private space of a cloud database through a cloud storage entry.

Optionally, the scenario saving instruction includes a local saving instruction, and the generating module is specifically configured to export and store the scenario description file in a user private space of a local database through a local saving entry.

Figure 6:
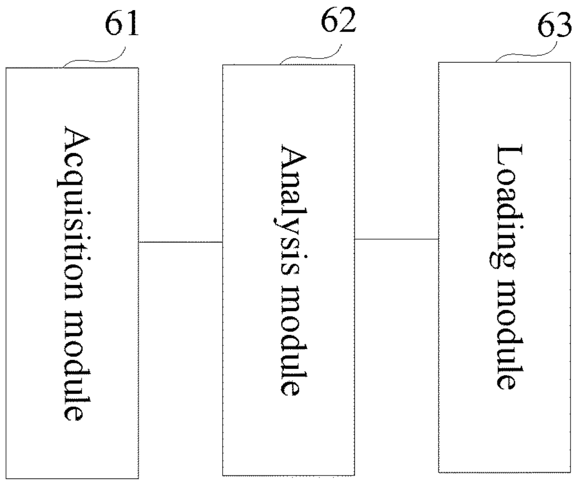
FIG. 6 illustrates a schematic diagram of a structure of a management apparatus for scenario data provided by yet another embodiment of the present disclosure.

FIG. 6 illustrates a schematic diagram of a structure of a management apparatus for scenario data provided by still another embodiment of the present disclosure. As shown in FIG. 6, the management apparatus for scenario data includes: an acquisition module 61, an analysis module 62 and a loading module 63.

The acquisition module 61 is configured to, in response to a received scenario loading request, acquire a scenario description file corresponding to the scenario loading request.

The analysis module 62 is configured to analyze the scenario description file based on a preset specification to obtain element attribute information of various scenario elements contained in a scenario model corresponding to the scenario description file.

The loading module 63 is configured to load and display the scenario model based on element attribute information of various scenario elements.

Optionally, the loading module is specifically configured to acquire various scenario elements contained in the scenario model, determine a scenario element configured with a trigger event as a target scenario element, and generate a trigger event matching with an event type corresponding to the target scenario element.

Optionally, the loading module is specifically configured to determine an event interface configured for the target scenario element, acquire event-associated data bound with the event interface, and generate the trigger event according to the event-associated data.

Optionally, the event type includes a monitoring type and a prediction type; the event—associated data bound with the event interface includes at least one of the followings: monitoring object data, monitoring strategy data and event response result data, of the trigger event.

Optionally, the analyzing module is specifically configured to acquire element description data contained in the scenario description file, and determine element attribute information of various scenario elements corresponding to the element description data based on a preset specification; wherein the element attribute information includes at least one of the followings: an element identifier, an element type, an element size, an element orientation, element extension data, and an element loading mode.

The specific structures and working principles of various modules can refer to the description of corresponding acts in the method embodiments, and will not be repeated here.

The management apparatus shown in FIG. 5 may be integrated in the GIS system, and the management apparatus shown in FIG. 6 may be integrated in either the GIS system or the service system. In addition, the management apparatuses in FIG. 5 and FIG. 6 may also be integrated into the same management apparatus, which is jointly disposed in the GIS system.

Figure 7:
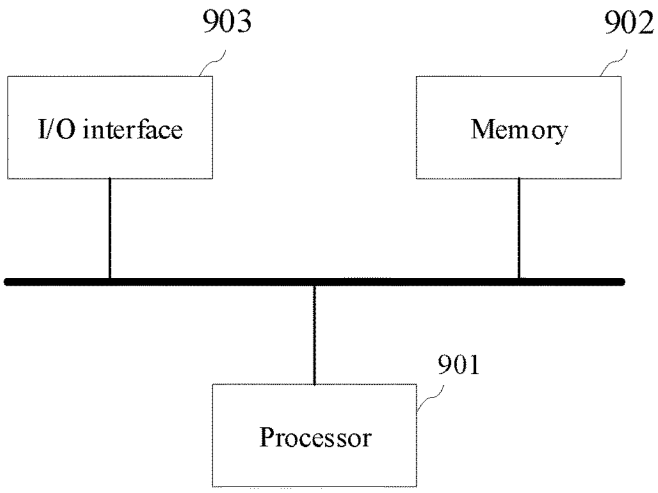
FIG. 7 is a schematic block diagram of an electronic device provided by an embodiment of the present disclosure.

Referring to FIG. 7, an embodiment of the present disclosure provides an electronic device including: one or more processors 901; a memory 902, having one or more programs stored thereon, when the one or more programs are executed by the one or more processors, the one or more processors implement the management method for scenario data of any one of the above; one or more I/O interfaces 903, connected between the processor and the memory and configured to implement information interaction between the processor and the memory.

The processor 901 is a device with data processing capability, including but being not limited to a central processing unit (CPU) and the like. The memory 902 is a device with data storage capability, including but being not limited to a random access memory (RAM, more specifically SDRAM, DDR, etc.), read only memory (ROM), electrically erasable programmable read only memory (EEPROM), FLASH memory (FLASH). The I/O interface (read-write interface) 903 is connected between the processor 901 and the memory 902, and can implement information interaction between the processor 901 and the memory 902, including but being not limited to a data Bus (Bus) and the like.

In some embodiments, the processor 901, the memory 902, and the I/O interface 903 are connected to each other via a bus, so as to be connected with other components of the computing device.

An embodiment also provides a computer readable medium on which a computer program is stored. When the program is executed by the processor, the management method for scenario data provided by the embodiment is implemented. In order to avoid repeated description, the specific acts of the management method for scenario data are not repeated here.

Those of ordinary skills in the art may understand that all or some of acts in the methods disclosed above, functional modules or units in systems and apparatuses may be implemented as software, firmware, hardware, and an appropriate combination thereof. In a hardware implementation, division between functional modules/units mentioned in the above description does not necessarily correspond to division of physical components. For example, a physical component may have multiple functions, or a function or an act may be performed by several physical components in cooperation. Some physical components or all physical components may be implemented as software executed by a processor such as a central processor, a digital signal processor or a microprocessor, or implemented as hardware, or implemented as an integrated circuit such as a specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile and nonvolatile, removable and irremovable media implemented in any method or technology for storing information (for example, computer-readable instructions, a data structure, a program module, or other data). The computer storage medium includes, but is not limited to, a RAM, a ROM, an EEPROM, a flash memory or another memory technology, a CD-ROM, a Digital Versatile Disk (DVD) or another optical disk storage, a magnetic cartridge, a magnetic tape, magnetic disk storage or another magnetic storage apparatus, or any other medium that may be used for storing desired information and may be accessed by a computer. In addition, it is known to those of ordinary skills in the art that the communication medium usually includes computer-readable instructions, a data structure, a program module, or other data in a modulated data signal, such as, a carrier or other transmission mechanisms, and may include any information delivery medium.

It should be noted that in the present disclosure, the term "include", "contain" or any other variations thereof is intended to cover a non-exclusive inclusion, such that a process, method, article, or apparatus that includes a series of elements not only includes those elements but also includes other elements which are not expressly listed, or further includes elements inherent to such a process, method, article, or apparatus. An element defined by a statement "include one . . . " does not exclude presence of additional identical elements in the process, method, article or system that includes the element, without more limitations.

It may be understood that the above embodiments are only exemplary embodiments employed for the purpose of illustrating the principles of the present disclosure, however the present disclosure is not limited thereto. To those of ordinary skills in the art, various modifications and improvements may be made without departing from the spirit and substance of the present disclosure, and these modifications and improvements are also considered to be within the protection scope of the present disclosure.

The invention claimed is:

1. A management method for scenario data, comprising:

drawing corresponding scenario elements through various element drawing entries contained in a scenario editing interface, wherein the scenario editing interface contains a plurality of element drawing entries used for drawing different types of scenario elements;

acquiring user private data stored in a private storage space through a private data access entry in the scenario editing interface; acquiring system public data stored in a public storage space through a public data access entry in the scenario editing interface;

editing the various drawn scenario elements based on the acquired user private data and the acquired system public data, to obtain a scenario model containing a plurality of scenario elements;

acquiring element attribute information of the various scenario elements contained in the scenario model in response to a received scenario saving instruction, generating a scenario description file corresponding to the element attribute information of the various scenario elements based on a preset specification, and storing the scenario description file in the private storage space and providing the scenario description file to a scenario analyzer for analysis and loading.

2. The method according to claim 1, wherein the private storage space further includes: a plurality of user private spaces respectively corresponding to different users;

acquiring user private data stored in the private storage space through the private data access entry in the scenario editing interface includes: determining a user private space corresponding to a current user in the private storage space according to a user identification, and acquiring user private data from the user private space corresponding to the current user; and before drawing corresponding scenario elements through various element drawing entries contained in the scenario editing interface, the method further comprises: acquiring a user identification and user private data contained in a private data uploading request in response to the received private data uploading request; and storing the user private data in the user private space, corresponding to the user identification, in the private storage space.

3. The method according to claim 1, wherein, after drawing corresponding scenario elements through various element drawing entries contained in the scenario editing interface, the method further comprises:

determining a scenario element corresponding to an event configuration request and configuring a trigger event matching with an event type contained in the event configuration request for the scenario element in response to the received event configuration request.

4. The method according to claim 3, wherein, configuring the trigger event matching with the event type contained in the event configuration request for the scenario element comprises:

configuring an event interface for the scenario element, and binding event-associated data corresponding to the trigger event with the event interface to configure the event type of the trigger event through the event interface.

5. The method according to claim 4, wherein, the event type includes a monitoring type and a prediction type; the event-associated data corresponding to the trigger event includes at least one of the followings: monitoring object data, monitoring strategy data and event response result data, of the trigger event.

6. The method according to claim 1, wherein, before drawing corresponding scenario elements through various element drawing entries contained in the scenario editing interface, the method further comprises: generating a scenario identification and creating scenario frame data in response to a received scenario creating request;

then drawing corresponding scenario elements through various element drawing entries contained in the scenario editing interface comprises: drawing the scenario elements based on the scenario frame data.

7. The method according to claim 6, wherein acquiring element attribute information of the various scenario elements contained in the scenario model in response to the received scenario saving instruction, generating the scenario description file corresponding to the element attribute information of the various scenario elements based on the preset specification comprises:

determining element attribute information of the various scenario elements contained in the scenario model respectively, generating element description data corresponding to the element attribute information of the scenario element based on the preset specification, and generating the scenario description file according to the element description data;

wherein the element attribute information comprises at least one of the followings: an element identifier, an element type, an element size, an element orientation, element extension data, and an element loading mode.

8. The method according to claim 7, wherein the scenario saving instruction comprises a cloud saving instruction, then storing the scenario description file in the private storage space includes:

associating and storing the scenario description file and the scenario identification in a user private space of a cloud database through a cloud saving entry.

9. The method according to claim 7, wherein the scenario saving instruction includes a local saving instruction, then storing the scenario description file in the private storage space comprises: exporting the scenario description file through a local saving entry and storing the scenario description file in a user private space of a local database.

10. The method according to claim 1, further comprising:

in response to a received scenario loading request, acquiring the scenario description file corresponding to the scenario loading request;

analyzing the scenario description file based on the preset specification to obtain the element attribute information of the various scenario elements contained in the scenario model corresponding to the scenario description file; and loading and displaying the scenario model based on the element attribute information of the various scenario elements.

11. The method according to claim 10, wherein loading and displaying the scenario model comprises:

acquiring the various scenario elements contained in the scenario model, determining a scenario element configured with a trigger event as a target scenario element, and generating a trigger event matching with an event type corresponding to the target scenario element.

12. The method according to claim 11, wherein determining the scenario element configured with the trigger event as the target scenario element, and generating the trigger event matching with the event type corresponding to the target scenario element comprises:

determining an event interface configured for the target scenario element, acquiring event-associated data bound with the event interface, and generating the trigger event according to the event-associated data bound with the event interface.

13. The method according to claim 12, wherein, the event type corresponding to the target scenario element comprises a monitoring type and a prediction type; the event-associated data bound with the event interface comprises at least one of the followings: monitoring object data, monitoring strategy data, and event response result data, of the trigger event.

14. The method according to claim 10, wherein, analyzing the scenario description file based on the preset specification to obtain the element attribute information of the various scenario elements contained in the scenario model corresponding to the scenario description file comprises:

acquiring element description data contained in the scenario description file, and determining the element attribute information of the various scenario elements corresponding to the element description data based on the preset specification;

wherein the element attribute information comprises at least one of the followings: an element identifier, an element type, an element size, an element orientation, element extension data, and an element loading mode.

15. The method according to claim 10, wherein the scenario loading request comprises: a cloud loading request, and in response to the received scenario loading request, acquiring the scenario description file corresponding to the scenario loading request comprises: acquiring a scenario identification contained in the scenario loading request, and acquiring a scenario description file corresponding to the scenario identification from a cloud database based on the scenario identification.

16. The method according to claim 10, wherein the scenario loading request comprises: a local loading request, and in response to the received scenario loading request, acquiring the scenario description file corresponding to the scenario loading request comprises: acquiring a scenario description file corresponding to a scenario identification stored locally according to the scenario identification contained in the scenario loading request.

17. The method according to claim 10, wherein the method is performed by a GIS system, or the method is performed by a service system capable of intercommunicating with the GIS system;

analyzing the scenario description file based on the preset specification to obtain the element attribute information of the various scenario elements contained in the scenario model corresponding to the scenario description file comprises:

analyzing the scenario description file through a scenario analyzer provided in the service system to obtain the scenario model corresponding to the scenario description file.

18. An electronic device, comprising:

one or more processors;

a memory, having one or more programs stored thereon, when the one or more programs are executed by the one or more processors, the one or more processors are enabled to implement the method according to claim 1;

one or more I/O interfaces, connected between the one or more processors and the memory and configured to implement information interaction between the one or more processors and the memory.

19. A management apparatus for scenario data, comprising:

a processor, configured to draw corresponding scenario elements through various element drawing entries contained in a scenario editing interface, wherein the scenario editing interface contains a plurality of element drawing entries used for drawing different types of scenario elements;

wherein the processor is further configured to acquire user private data stored in a private storage space through a private data access entry in the scenario editing interface; and acquire system public data stored in a public storage space through a public data access entry in the scenario editing interface;

edit the various drawn scenario elements based on the acquired user private data and the acquired system public data to obtain a scenario model containing a plurality of scenario elements; and acquire element attribute information of the various scenario elements contained in the scenario model in response to a received scenario saving instruction, generate a scenario description file corresponding to the element attribute information of the various scenario elements based on a preset specification, and store the scenario description file in the private storage space and providing the scenario description file to a scenario analyzer for analysis and loading.

20. The management apparatus for scenario data according to claim 19, wherein the processor is further configured to, in response to a received scenario loading request, acquire the scenario description file corresponding to the scenario loading request; analyze the scenario description file based on the preset specification to obtain the element attribute information of the various scenario elements contained in the scenario model corresponding to the scenario description file; and load and display the scenario model based on the element attribute information of the various scenario elements.

* * * * *